(12) United States Patent
Bartos et al.

(10) Patent No.: US 10,917,421 B2
(45) Date of Patent: Feb. 9, 2021

(54) REFINING SYNTHETIC MALICIOUS SAMPLES WITH UNLABELED DATA

(71) Applicant: Cisco Technology, Inc., San Jose, CA (US)

(72) Inventors: Karel Bartos, Prague (CZ); Vojtech Franc, Roudnice Nad Labem (CZ); Vit Zlamal, Prague (CZ)

(73) Assignee: Cisco Technology, Inc., San Jose, CA (US)

( * ) Notice: Subject to any disclaimer, the term of this patent is extended or adjusted under 35 U.S.C. 154(b) by 237 days.

(21) Appl. No.: 15/898,789

(22) Filed: Feb. 19, 2018

(65) Prior Publication Data

US 2019/0260775 A1     Aug. 22, 2019

(51) Int. Cl.
*G06F 21/56* (2013.01)
*G06F 21/55* (2013.01)
*H04L 29/06* (2006.01)

(52) U.S. Cl.
CPC ........ *H04L 63/1425* (2013.01); *G06F 21/552* (2013.01); *G06F 21/564* (2013.01); *G06F 21/566* (2013.01); *H04L 63/1416* (2013.01)

(58) Field of Classification Search
CPC . H04L 63/1425; H04L 63/1416; G06F 21/52; G06F 21/564; G06F 21/566
See application file for complete search history.

(56) References Cited

U.S. PATENT DOCUMENTS

| 2009/0116394 | A1* | 5/2009 | Varadarajan | ......... | H04L 43/062 |
| | | | | | 370/241 |
| 2014/0201208 | A1 | 7/2014 | Satish et al. | | |
| 2015/0081389 | A1* | 3/2015 | Dereszynski | ...... | G06Q 30/0204 |
| | | | | | 705/7.33 |
| 2017/0026390 | A1 | 1/2017 | Sofka et al. | | |
| 2017/0061322 | A1 | 3/2017 | Chari et al. | | |
| 2017/0063892 | A1 | 3/2017 | Bartos et al. | | |
| 2017/0083703 | A1 | 3/2017 | Abbasi et al. | | |
| 2017/0325113 | A1* | 11/2017 | Markopoulou | ... | H04W 12/0013 |
| 2018/0004948 | A1* | 1/2018 | Martin | .................. | G06F 21/566 |
| 2019/0215329 | A1* | 7/2019 | Levy | .................... | H04L 63/145 |

OTHER PUBLICATIONS

"Improving the Realism of Synthetic Images", Machine Learning Journal, https://machinelearning.apple.com/2017/07/07/GAN.html, Jul. 2017, 8 pages, Apple Inc.

* cited by examiner

*Primary Examiner* — Lynn D Feild
*Assistant Examiner* — Vladimir I Gavrilenko
(74) *Attorney, Agent, or Firm* — Behmke Innovation Group LLC; James M. Behmke; Jonathon P. Western

(57) ABSTRACT

In one embodiment, a security device in a computer network determines a plurality of values for a plurality of features from samples of known malware, and computes one or more significant values out of the plurality of values, where each of the one or more significant values occurs across greater than a significance threshold of the samples. The security device may then determine feature values for samples of unlabeled traffic, and declares one or more particular samples of unlabeled traffic as synthetic malicious flow samples in response to all feature values for each synthetic malicious flow sample matching a respective one of the significant values for each corresponding respective feature. The security device may then use the samples of known malware and the synthetic malicious flow samples for model-based malware detection.

15 Claims, 11 Drawing Sheets

FEATURE SPACE WITH KNOWN MALICIOUS SAMPLES.

400

VOLUME FEATURES x x
x x x
x

TIME FEATURES

| x | KNOWN MALWARE 410 |

FIG. 4A

PSEUDOCODE 700

```
function findNewMaliciousRecords()
    allMwFamilies ← getAllMwFamilies()
    superBuckets;

for mwFamily from allMwFamilies
        sigValues ← computeBucketSigValues(mwFamily.proxyLogRecords)
        superBuckets.add(sigValues)

background ← getBackgroundRecords()

potentiallyMalicious ← {}
    for record from background
        recordBuckets ← record.computeBuckets()
        if superBuckets.contains(recordBuckets)
            potentiallyMalicious.add(record)

malicious ← {}
    for sample from potentiallyMalicious
        hostname ← sample.hostname()
        if allRecordsAreSimilar(background, hostname)
            malicious.add(sample)
``` return malicious

FIG. 7

REFINING SYNTHETIC MALICIOUS SAMPLES WITH UNLABELED DATA

TECHNICAL FIELD

The present disclosure relates generally to computer networks, and, more particularly, to refining synthetic malicious samples with unlabeled data.

BACKGROUND

It is generally understood by computer network security experts that nearly all corporate networks are infected by some form of malware. As the variability of malware samples has been rapidly increasing over the last few years, the ability to detect new variants and modifications of existing malware is becoming very important. Machine learning is beginning to be successfully applied to complement signature-based devices. However, machine learning methods require a large amount of labeled data for training, which limits their applicability due to high costs associated with labeling. Moreover, a malware detector is trained at a certain time point, but later malware typically evolves to evade detection.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 4A-4D illustrate an example demonstration of finding new malware variants;

FIG. 7 illustrates an example of pseudocode for finding new malicious records.

DESCRIPTION OF EXAMPLE EMBODIMENTS

Overview

According to one or more embodiments of the disclosure, a security device in a computer network determines a plurality of values for a plurality of features from samples of known malware, and computes one or more significant values out of the plurality of values, where each of the one or more significant values occurs across greater than a significance threshold of the samples. The security device may then determine feature values for samples of unlabeled traffic, and declares one or more particular samples of unlabeled traffic as synthetic malicious flow samples in response to all feature values for each synthetic malicious flow sample matching a respective one of the significant values for each corresponding respective feature. The security device may then use the samples of known malware and the synthetic malicious flow samples for model-based malware detection.

DESCRIPTION

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Figure 1:
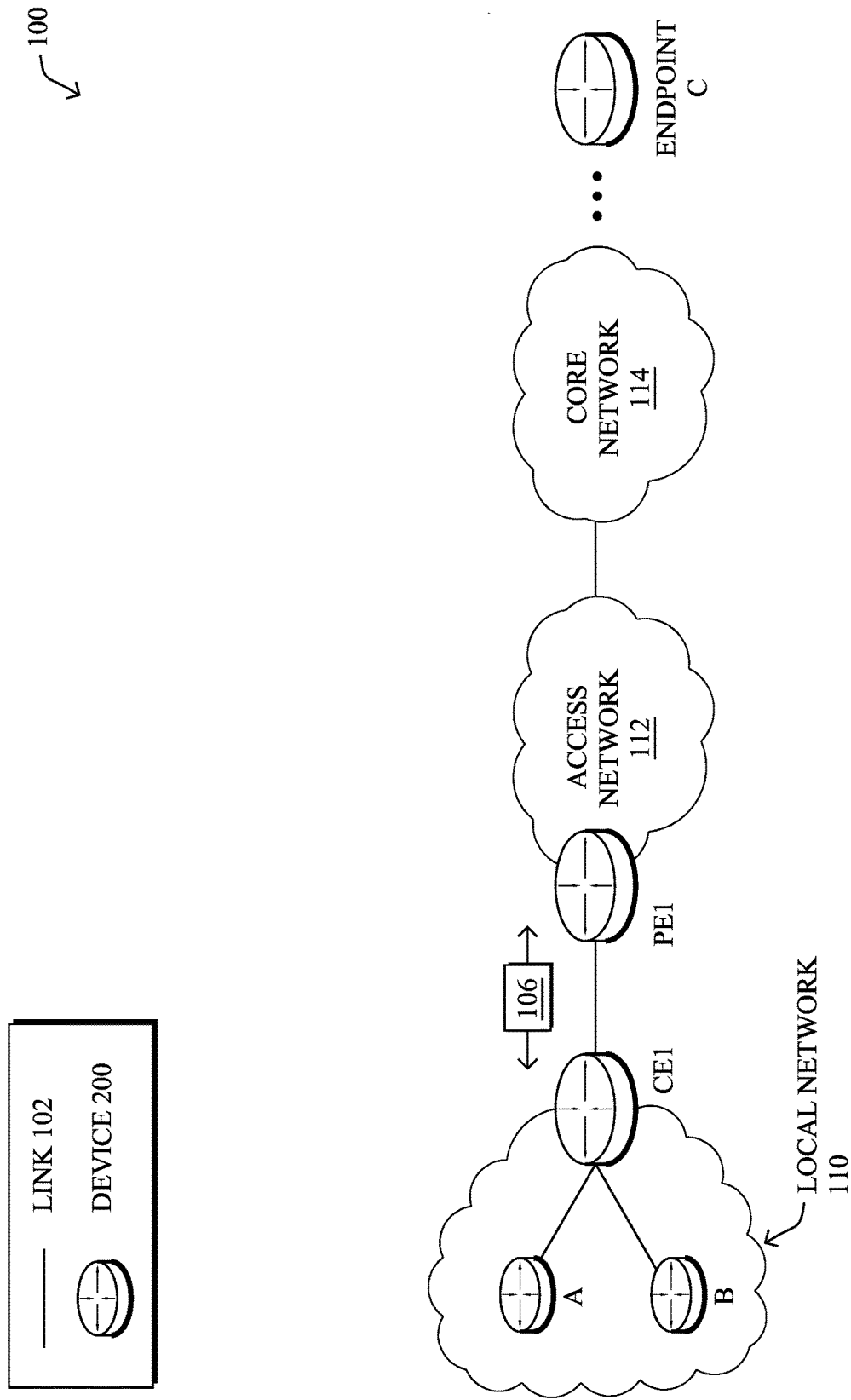
FIG. 1 illustrates an example communication network.

FIG. 1 is a schematic block diagram of an example communication network 100 illustratively comprising nodes/devices 200, such as a plurality of routers/devices interconnected by links and/or networks, as shown. For example, a customer edge (CE) router CE1 may interconnect nodes A and B on a local network 110 with a provider edge (PE) router PE1 of an access network 112. In turn, access network 112 may provide local network 110 with connectivity to a core network 114, such as the Internet.

The various nodes/devices 200 may exchange data packets 106 (e.g., traffic/messages) via communication network 100 over links 102 using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity. For example, node A in local network 110 may communicate with an endpoint node/device C (e.g., a remote server, etc.) via communication network 100.

As would be appreciated, links 102 may include any number of wired and/or wireless connections between devices. For example, node A may communicate wirelessly using a WiFi™ connection, CE1 and PE1 may communicate wirelessly using a cellular connection or via a hardwired connection (e.g., DSL, etc.), etc. In addition, while certain devices are depicted in FIG. 1, the view shown is a simplified view of communication network 100. In other words, communication network 100 may also include any number of intermediary networking devices such as, but not limited to, routers, switches, firewalls, etc., that are not shown.

In various embodiments, nodes/devices 200 may employ a secure communication mechanism, to encrypt and decrypt data packets 106. For example, nodes/devices 200 shown may use a Transport Layer Security (TLS) mechanism, such as the hypertext transfer protocol (HTTP) secure (HTTPS) protocol, to encrypt and decrypt data packets 106.

Figure 2:
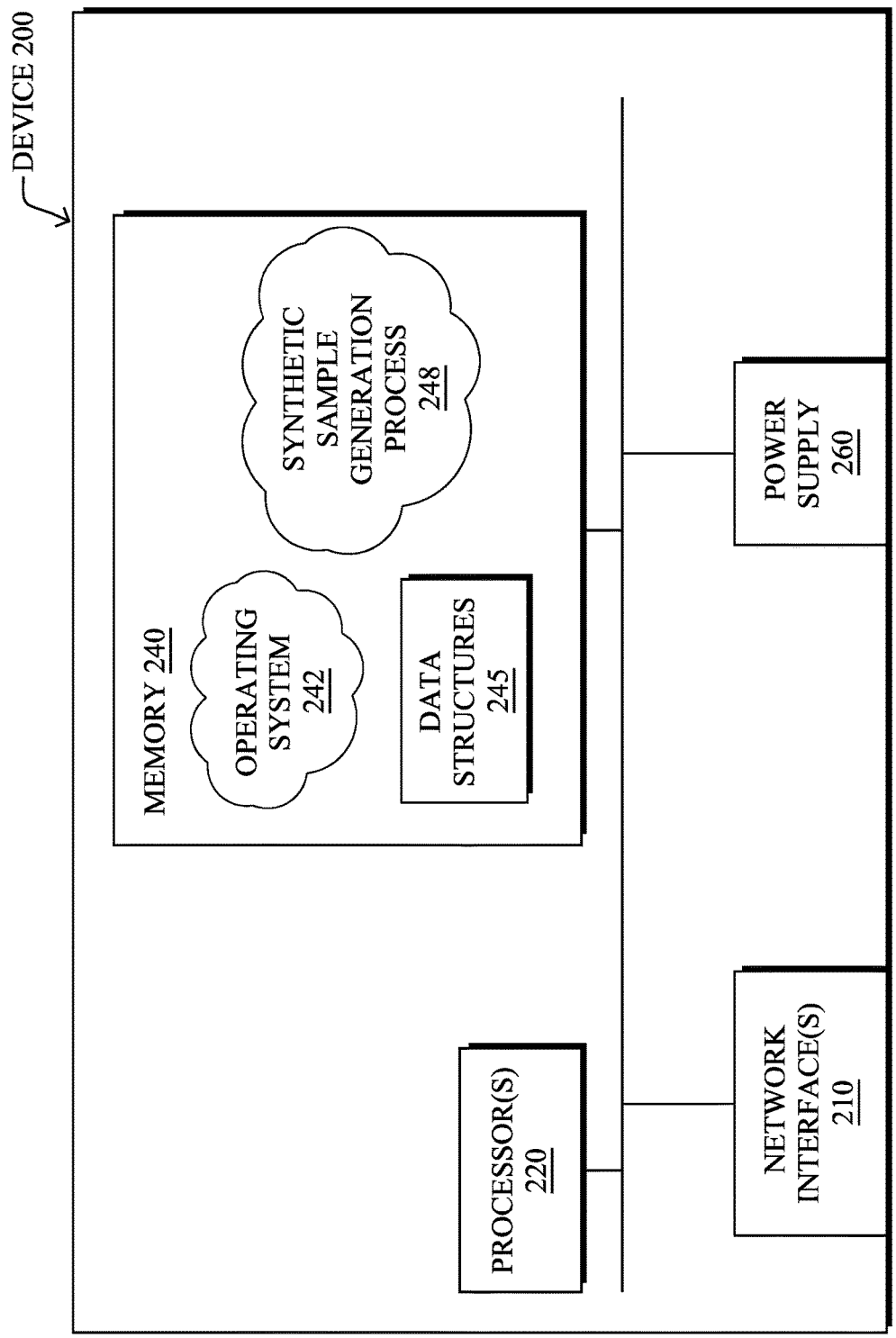
FIG. 2 illustrates an example network device/node.

FIG. 2 is a schematic block diagram of an example node/device 200 that may be used with one or more embodiments described herein, e.g., as any of the computing devices shown in FIG. 1, any other computing device that supports the operations of network 100 (e.g., switches, etc.), or any of the other devices referenced below. The device 200 may also be any other suitable type of device depending upon the type of network architecture in place. As shown, device 200 comprises one or more network interface(s) 210, one or more processor(s) 220, and a memory 240 interconnected by a system bus 250 and powered by a power supply 260.

The network interface(s) 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interface(s) 210 for storing software programs and data structures associated with the embodiments described herein. The processor 220 may comprise necessary elements or logic adapted to execute the software programs and manipulate the data structures 245. An operating system 242, portions of which are typically resident in memory 240 and executed by the processor(s), functionally organizes the node by, among other things, invoking network operations in support of software processors and/or services executing on the device. These software processors and/or services may comprise a synthetic sample generation process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

The device 200 may be part of a self-learning network (SLN), configured to perform anomaly detection functions as part of an anomaly detection infrastructure within the network. In general, anomaly detection attempts to identify patterns that do not conform to an expected behavior. For example, in one embodiment, the anomaly detection infrastructure of the network may be operable to detect network attacks (e.g., DDoS attacks, the use of malware such as viruses, rootkits, etc.). However, anomaly detection in the context of computer networking typically presents a number of challenges: 1) a lack of a ground truth (e.g., examples of normal vs. abnormal network behavior), 2) being able to define a "normal" region in a highly dimensional space can be challenging, 3) the dynamic nature of the problem due to changing network behaviors/anomalies, 4) malicious behaviors such as malware, viruses, rootkits, etc. may adapt in order to appear "normal," and 5) differentiating between noise and relevant anomalies is not necessarily possible from a statistical standpoint, but typically also requires domain knowledge.

Anomalies may also take a number of forms in a computer network: 1) point anomalies (e.g., a specific data point is abnormal compared to other data points), 2) contextual anomalies (e.g., a data point is abnormal in a specific context but not when taken individually), or 3) collective anomalies (e.g., a collection of data points is abnormal with regards to an entire set of data points). Generally, anomaly detection refers to the ability to detect an anomaly that could be triggered by the presence of malware attempting to access data (e.g., data exfiltration), spyware, ransom-ware, etc. and/or non-malicious anomalies such as misconfigurations or misbehaving code. Particularly, an anomaly may be raised in a number of circumstances:

Security threats: the presence of a malware using unknown attacks patterns (e.g., no static signatures) may lead to modifying the behavior of a host in terms of traffic patterns, graphs structure, etc. Machine learning processes may detect these types of anomalies using advanced approaches capable of modeling subtle changes or correlation between changes (e.g., unexpected behavior) in a highly dimensional space. Such anomalies are raised in order to detect, e.g., the presence of a 0-day malware, malware used to perform data ex-filtration thanks to a Command and Control (C2) channel, or even to trigger (Distributed) Denial of Service (DoS) such as DNS reflection, UDP flood, HTTP recursive get, etc. In the case of a (D)DoS, although technical an anomaly, the term "DoS" is usually used.

Malware may be detected based on the corresponding impact on traffic, host models, graph-based analysis, etc., when the malware attempts to connect to a C2 channel, attempts to move laterally, or exfiltrate information using various techniques.

Misbehaving devices: a device such as a laptop, a server of a network device (e.g., storage, router, switch, printer, etc.) may misbehave in a network for a number of reasons: 1) a user using a discovery tool that performs (massive) undesirable scanning in the network (in contrast with a lawful scanning by a network management tool performing device discovery), 2) a software defect (e.g. a switch or router dropping packet because of a corrupted RIB/FIB or the presence of a persistent loop by a routing protocol hitting a corner case).

Dramatic behavior change: the introduction of a new networking or end-device configuration, or even the introduction of a new application may lead to dramatic behavioral changes. Although technically not anomalous, an SLN-enabled node having computed behavioral model(s) may raise an anomaly when detecting a brutal behavior change. Note that in such as case, although an anomaly may be raised, a learning system such as SLN expected to learn the new behavior and dynamically adapts according to potential user feedback.

Misconfigured devices: a configuration change may trigger an anomaly: a misconfigured access control list (ACL), route redistribution policy, routing policy, QoS policy maps, or the like, may have dramatic consequences such a traffic black-hole, QoS degradation, etc. Identify these forms of misconfigurations allow them to be detected and fixed.

In various embodiments, machine learning techniques may be utilized to perform anomaly detection in the network. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

Computational entities that rely on one or more machine learning techniques to perform a task for which they have not been explicitly programmed to perform are typically referred to as learning machines. In particular, learning machines are capable of adjusting their behavior to their environment. For example, a learning machine may dynamically make future predictions based on current or prior network measurements, may make control decisions based on the effects of prior control commands, etc.

For purposes of anomaly detection in a network, a learning machine may construct a model of normal network behavior, to detect data points that deviate from this model. For example, a given model (e.g., a supervised, un-supervised, or semi-supervised model) may be used to generate and report anomaly scores to another device. Example machine learning techniques that may be used to construct and analyze such a model may include, but are not limited to, nearest neighbor (NN) techniques (e.g., k-NN models, replicator NN models, etc.), statistical techniques (e.g., Bayesian networks, etc.), clustering techniques (e.g., k-means, etc.), neural networks (e.g., reservoir networks, artificial neural networks, etc.), support vector machines (SVMs), or the like.

One class of machine learning techniques that is of particular use in the context of anomaly detection is clustering. Generally speaking, clustering is a family of techniques that seek to group data according to some typically predefined notion of similarity. For instance, clustering is a very popular technique used in recommender systems for grouping objects that are similar in terms of people's taste (e.g., because you watched X, you may be interested in Y, etc.). Typical clustering algorithms are k-means, density based spatial clustering of applications with noise (DB-SCAN) and mean-shift, where a distance to a cluster is computed with the hope of reflecting a degree of anomaly (e.g., using a Euclidian distance and a cluster based local outlier factor that takes into account the cluster density).

Replicator techniques may also be used for purposes of anomaly detection. Such techniques generally attempt to replicate an input in an unsupervised manner by projecting the data into a smaller space (e.g., compressing the space, thus performing some dimensionality reduction) and then reconstructing the original input, with the objective of keeping the "normal" pattern in the low dimensional space. Example techniques that fall into this category include principal component analysis (PCA) (e.g., for linear models), multi-layer perceptron (MLP) ANNs (e.g., for non-linear models), and replicating reservoir networks (e.g., for non-linear models, typically for time series).

According to various embodiments, graph-based models may be used for purposes of anomaly detection. Generally speaking, a graph-based model attempts to represent the relationships between different entities as a graph of nodes interconnected by edges. For example, ego-centric graphs have been used to represent the relationship between a particular social networking profile and the other profiles connected to it (e.g., the connected "friends" of a user, etc.). The patterns of these connections can then be analyzed for purposes of anomaly detection. For example, in the social networking context, it may be considered anomalous for the connections of a particular profile not to share connections, as well. In other words, a person's social connections are typically also interconnected. If no such interconnections exist, this may be deemed anomalous.

One type of network attack that is of particular concern in the context of computer networks is a Denial of Service (DoS) attack. In general, the goal of a DoS attack is to prevent legitimate use of the services available on the network. For example, a DoS jamming attack may artificially introduce interference into the network, thereby causing collisions with legitimate traffic and preventing message decoding. In another example, a DoS attack may attempt to overwhelm the network's resources by flooding the network with requests (e.g., SYN flooding, sending an overwhelming number of requests to an HTTP server, etc.), to prevent legitimate requests from being processed. A DoS attack may also be distributed, to conceal the presence of the attack. For example, a distributed DoS (DDoS) attack may involve multiple attackers sending malicious requests, making it more difficult to distinguish when an attack is underway. When viewed in isolation, a particular one of such a request may not appear to be malicious. However, in the aggregate, the requests may overload a resource, thereby impacting legitimate requests sent to the resource.

Botnets represent one way in which a DDoS attack may be launched against a network. In a botnet, a subset of the network devices may be infected with malicious software, thereby allowing the devices in the botnet to be controlled by a single master. Using this control, the master can then coordinate the attack against a given network resource.

DoS attacks are relatively easy to detect when they are brute-force (e.g. volumetric), but, especially when highly distributed, they may be difficult to distinguish from a flash-crowd (e.g., an overload of the system due to many legitimate users accessing it at the same time). This fact, in conjunction with the increasing complexity of performed attacks, makes the use of "classic" (usually threshold-based) techniques useless for detecting them. However, machine learning techniques may still be able to detect such attacks, before the network or service becomes unavailable. For example, some machine learning approaches may analyze changes in the overall statistical behavior of the network traffic (e.g., the traffic distribution among flow flattens when a DDoS attack based on a number of microflows happens). Other approaches may attempt to statistically characterizing the normal behaviors of network flows or TCP connections, in order to detect significant deviations. Classification approaches try to extract features of network flows and traffic that are characteristic of normal traffic or malicious traffic, constructing from these features a classifier that is able to differentiate between the two classes (normal and malicious).

Assume, for purposes of illustration, that a security device (e.g., a customer edge router, firewall, etc.) monitors traffic flows associated with the devices of a local network (e.g., by comparing the monitored conditions to one or more machine-learning models). For example, assume that device/node (e.g., node A) sends a particular traffic flow to a server (e.g., an application server, etc.). In such a case, the security device may monitor the packets of the traffic flow and, based on its local anomaly detection mechanism, determine that the traffic flow is anomalous. Anomalous traffic flows may be incoming, outgoing, or internal to a local network serviced by a DLA, in various cases.

In some cases, the traffic may be associated with a particular application supported by network 100. Such applications may include, but are not limited to, automation applications, control applications, voice applications, video applications, alert/notification applications (e.g., monitoring applications), communication applications, and the like. For example, traffic may be email traffic, HTTP traffic, traffic associated with an enterprise resource planning (ERP) application, etc.

In various embodiments, the anomaly detection mechanisms in network 100 may use Internet Behavioral Analytics (IBA). In general, IBA refers to the use of advanced analytics coupled with networking technologies, to detect anomalies in the network. The ability to model the behavior of a device (networking switch/router, host, etc.) will allow for the detection of malware, which is complementary to the use of a firewall that uses static signatures. Observing behavioral changes (e.g., a deviation from modeled behavior) thanks to aggregated flows records, deep packet inspection, etc., may allow detection of an anomaly such as an horizontal movement (e.g. propagation of a malware, etc.), or an attempt to perform information exfiltration.

—Refining Synthetic Malicious Samples with Unlabeled Data—

As noted above, the ability to detect new variants and modifications of existing malware becomes increasingly important as the variability of malware samples also increases. As also mentioned above, machine learning can be used to complement signature-based devices, but require a large amount of labeled data for training. Labelled training data can be particularly difficult to obtain, both in terms of cost and availability, and once a malware detector is trained, malware generally evolves over time specifically to evade detection. Previous concepts for generating synthetic data samples have been based on modifying labeled samples acquired from one environment so that they resemble the environment that the classifiers will be deployed on.

The techniques herein, on the other hand, do not rely on modifying a predefined set of features in this manner, but instead use a generator with statistical and formal grammar models to create new versions of malicious samples, while readily coping with temporal changes of malware behavior. That is, the techniques herein provide for detecting new and previously unseen malicious threats, where the system uses a generator to create new variants of existing malware, and then verifies and refines the variants by using lots of unlabeled data, so the newly-generated malware samples are realistic and can be used for training of classifiers.

Specifically, according to one or more embodiments of the disclosure as described in detail below, a security device in a computer network determines a plurality of values for a plurality of features from samples of known malware, and computes one or more significant values out of the plurality of values, where each of the one or more significant values occurs across greater than a significance threshold of the samples. The security device may then determine feature values for samples of unlabeled traffic, and declares one or more particular samples of unlabeled traffic as synthetic malicious flow samples in response to all feature values for each synthetic malicious flow sample matching a respective one of the significant values for each corresponding respective feature. The security device may then use the samples of known malware and the synthetic malicious flow samples for model-based malware detection.

Illustratively, the techniques described herein may be performed by hardware, software, and/or firmware, such as in accordance with the synthetic sample generation process 248, which may include computer executable instructions executed by the processor 220 to perform functions relating to the techniques described herein, e.g., in conjunction with one or more other processes or devices, accordingly.

Operationally, the techniques herein leverage existing samples already labeled, to generate new and previously unknown labels. That is, the techniques herein continuously enrich labeled data with synthetic samples that are refined with lots of unlabeled real data to be indistinguishable from the real data. These synthetic samples, which enrich the database of labeled malware, can be used to find new and previously unseen variants of malware samples. Notably, a classifier trained from this enriched database will have higher recall and better generalization ability, as well as the ability to detect new malware.

According to one or more embodiments herein, and as described in below, the techniques herein generally consist of two main components: generation and refinement.

In particular, as described below, a generator may be trained to produce new variants of malicious samples—such as malicious network communication (e.g., network flows or "NetFlows", Proxy Logs, encrypted traffic analysis (ETA) data, etc.) or malicious modifications of binaries. This can be achieved by combining or modifying existing known (labeled) samples according to the model of the generator. The model is a combination of two parts (statistical and formal grammar), allowing the generator to create new instances not randomly, but rather according to a certain constrains defined by the labeled data.

Said differently, the generator portion creates combinations of labeled data, such as by cross fitting behavior from one known malicious sample and another known malicious sample, since many malicious attackers re-use code snippets and infrastructure for different purposes. Accordingly, the resultant synthetic samples are a mixture of several known behaviors (e.g., groups or "buckets" of features correlated with each other, as described below), which can be a good indicator for classification of malware (e.g., actual malware or potentially newly discovered malware). The techniques herein further strengthen the ability to adapt to an attacker adjusting the malicious code, since if the attacks change over time, the mixture of known behaviors (i.e., the bucket values) change, too.

The refinement aspect of the techniques herein, on the other hand, further removes any flaws or artifacts introduced in the generator so the newly-created samples will be indistinguishable from the real data. In particular, the new synthetic samples may not be realistic with regard to actual traffic (e.g., not naturally occurring or perhaps even possible), so the refinement takes the synthetic samples generated, and matches them to real network data to use as the samples. Only such samples are thus used for training to increase the efficacy of the detection/classification models. That is, the techniques herein, therefore, correlate a large unlabeled set of real data (traffic), which is generally easy (and inexpensive) to obtain, with the newly-generated samples to find similar equivalents of the generated samples in the real traffic. These real equivalents are further used to refine the generated samples, making them practically real and valuable for the training.

Figure 3:
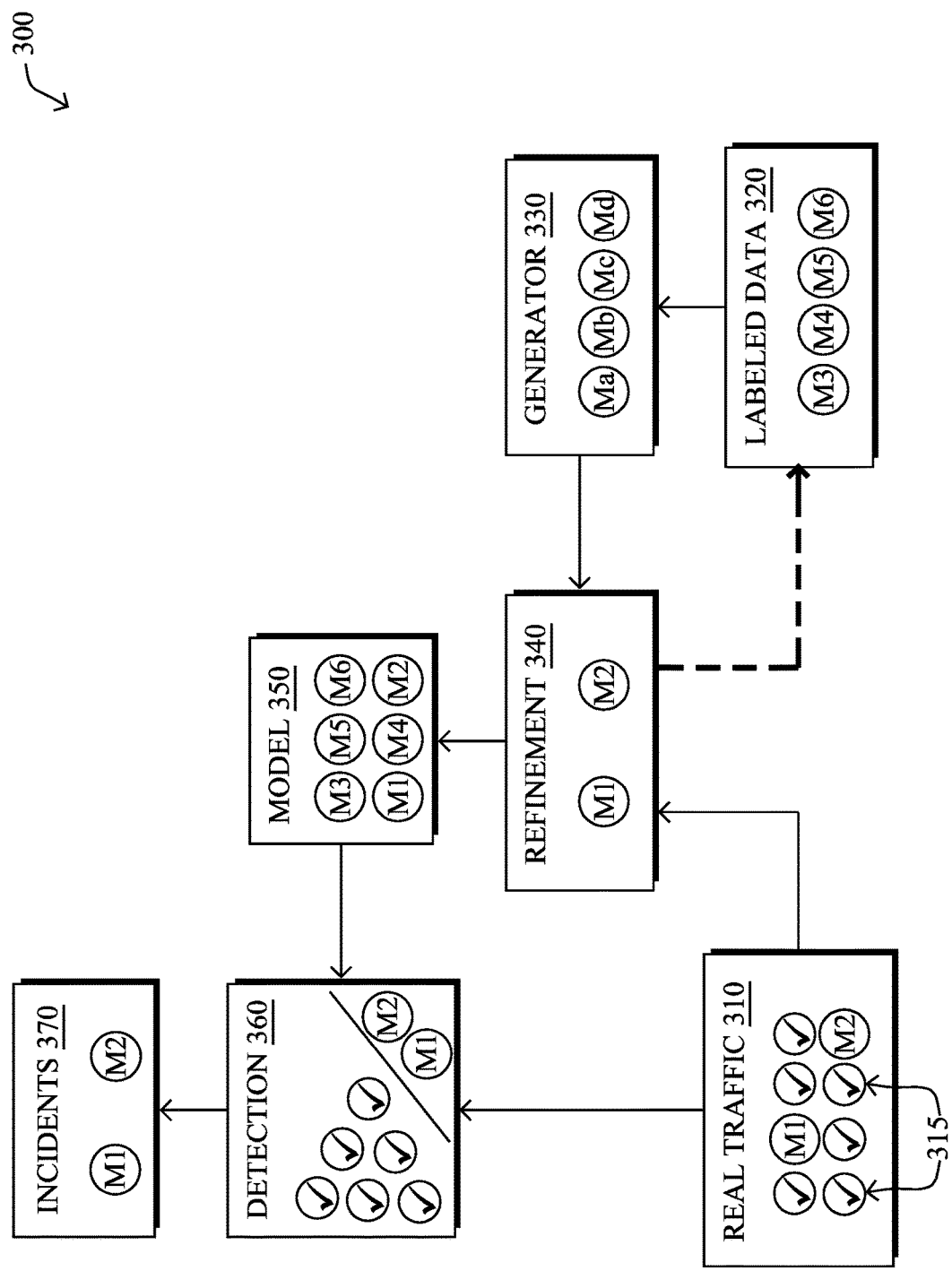
FIG. 3 illustrates an example system for refining synthetic samples with unlabeled real data integrated with a detection system allowing automatic retraining.

Both components above can be easily connected to existing detection or classification systems according to the techniques herein. An example system 300 for refining synthetic samples with unlabeled real data (integrated with a detection system allowing automatic retraining) is shown in FIG. 3. In particular, assume that real network traffic 310 has legitimate traffic 315 and two novel threats, referred in the figures as "M1" and "M2", where everything in the real network traffic at this point is unlabeled data. These threats M1 and M2 may be new or previously unseen variants of existing malware, so they are not yet part of the labeled data 320 (with labelled data referred to as "M3" through "M6"). This means that the detection system is not yet trained to detect such threats.

According to the techniques herein, the generator 330 creates a set of synthetic malicious samples ("Ma" through "Md") by modifying or combining existing known samples together. This way, the proposed system can generate new and previously unseen malware threats. However, most of the threats will be generated with flaws/artifacts and cannot be used directly in training.

Accordingly, the refinement portion 340 removes the artifacts by using lots of real unlabeled data 310. The refinement ensures that generated samples will look indistinguishable from real samples and can be used for training. It this specific example, the refinement received four candidates for new malicious samples created by the generator (Ma, Mb, Mc, and Md). The refinement looks into the large set of unlabeled real data 310 for similarities with the candidates, and then a real equivalent was found for two candidates, M1 and M2. These two candidates were refined by using their real equivalents and the flaws/artifacts were removed.

These new samples can be automatically included to the detection model 350 (along with previously labelled data M3-M6), and can be successfully detected by a detection device 360 and reported as the two incidents 370.

According to the techniques herein, as malware is modular and attackers frequently reuse malicious and legitimate code snippets, new malware variants can be found by careful mixing of feature values of existing malware. An example of the techniques herein for finding new malware variants is illustrated in FIGS. 4A-4D.

Figure 4B:
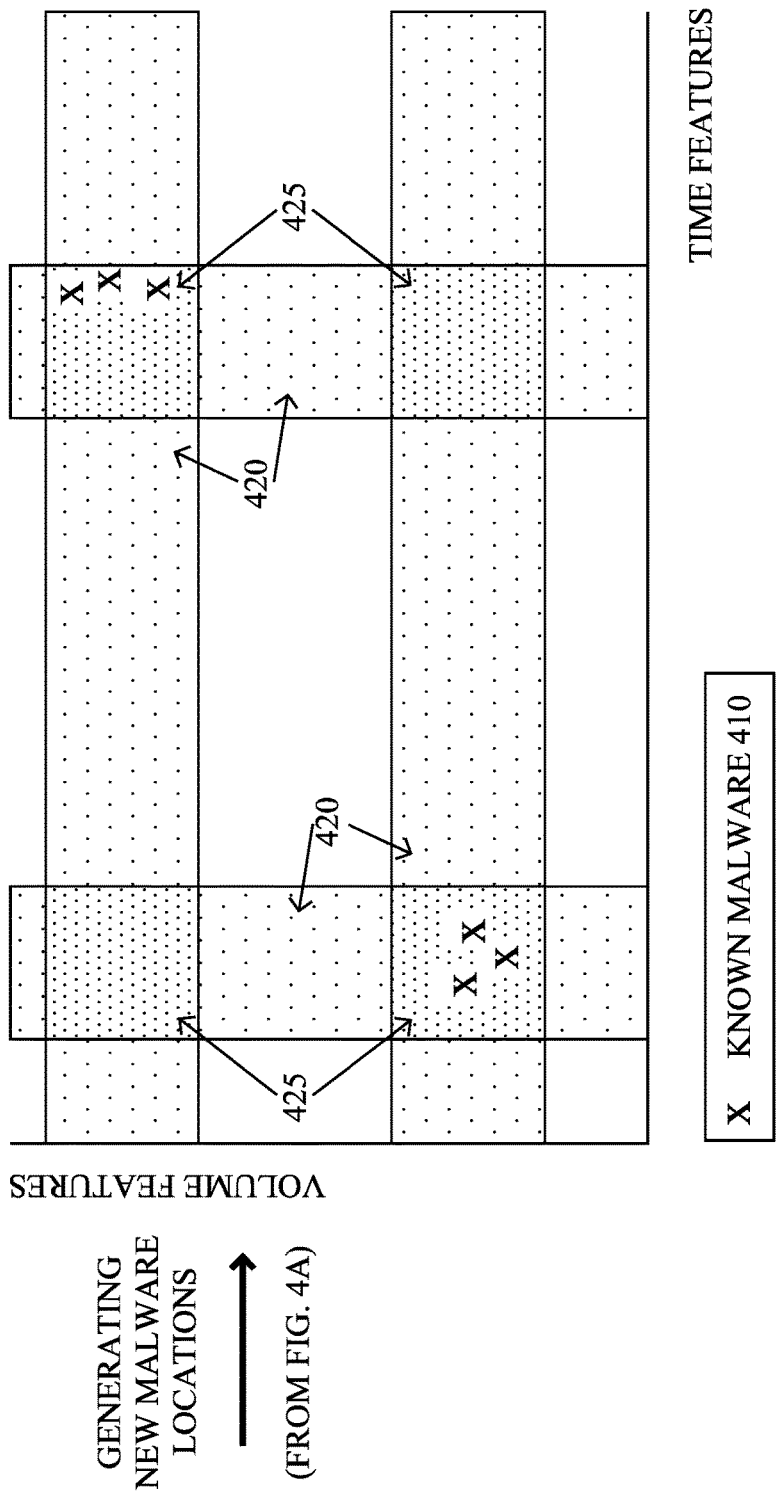
Figure 4C:
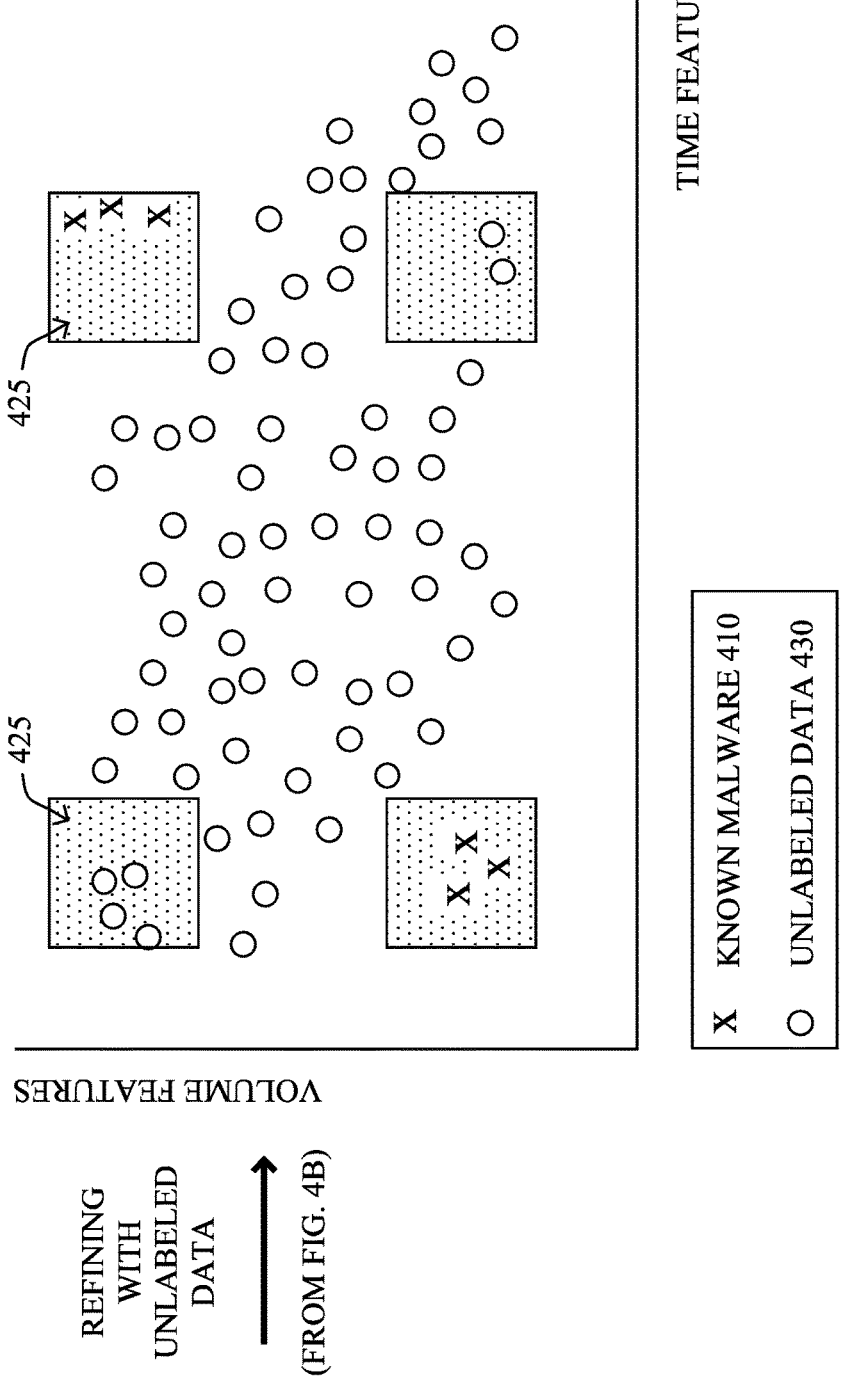
Figure 4D:
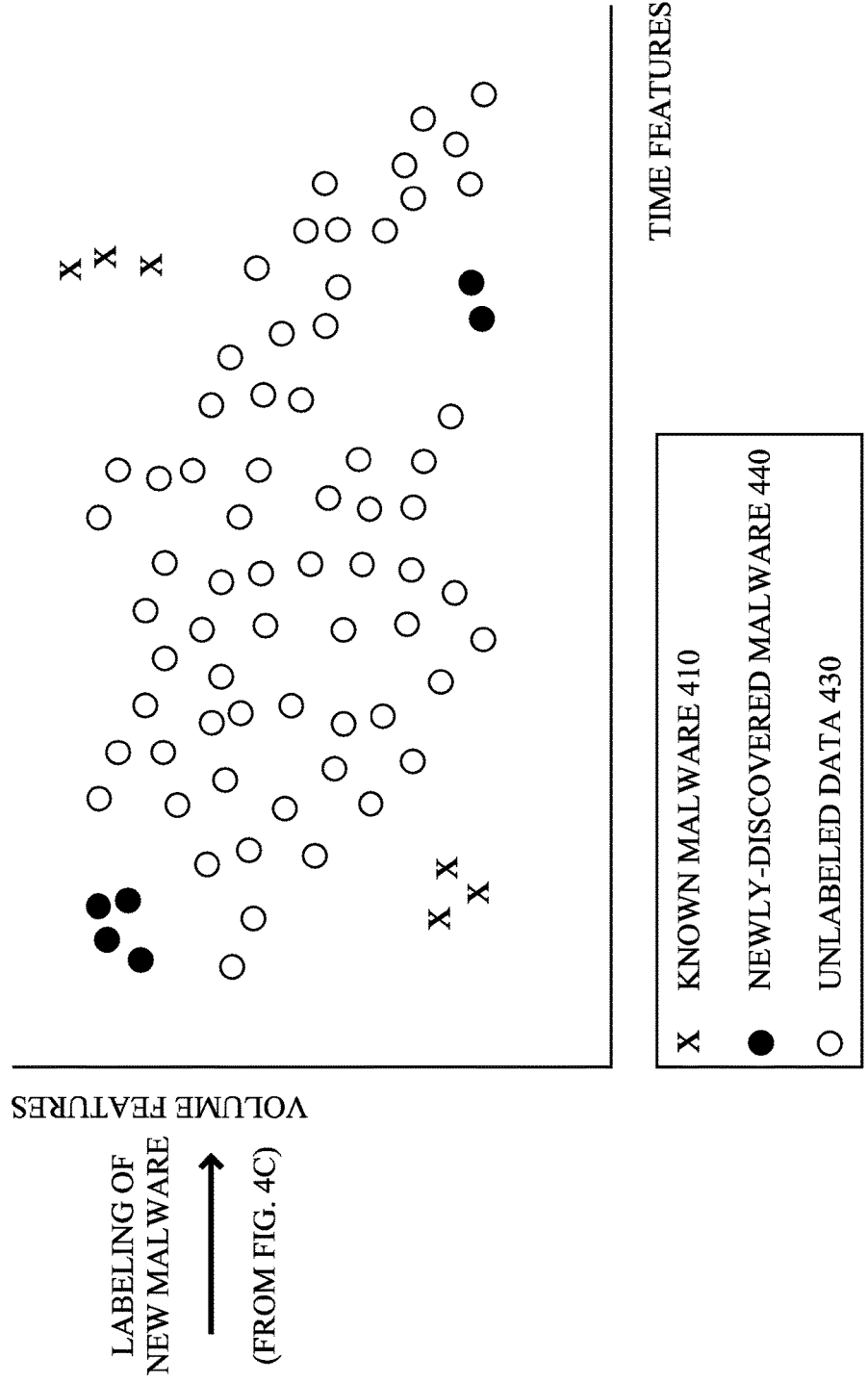

First, as shown in FIG. 4A, existing malware 410 is projected into the feature space 400. As shown in FIG. 4B, the generator will generate variants of the existing malware (illustrated by shaded areas 420) by modifying the feature values of the existing malware. Thanks to the malware modularity, in particular, the intersection areas 425 are most promising for finding new variants. Finally, as shown in FIG. 4C, the refiner projects large amount of unlabeled data 430 into the feature space 400, and samples 440 in the intersecting areas can be marked as new variants of malware (FIG. 4D).

As a further illustration, assume proxy logs of malware samples from two different malware families, where feature vectors are extracted for each sample. By grouping correlated features together and creating a set of feature "buckets" (as described below), each feature bucket can be used to describe a specific behavioral property of the sample (e.g. time, volume, URL structure, etc.). For example, a volume bucket may comprise the following features: number of bytes, number of packets, and average packet size. In FIGS. 4A-4D, for example, the horizontal axis represents buckets of time features and the vertical axis represents buckets of volume features.

Each malware family can be described by a set of feature buckets that are independent with each other. By using a generator to mix feature buckets of the first malware family with feature buckets of the second malware family (each of the shaded areas 420 in FIG. 4B), a hybrid from the two known malware families can be created (i.e., the overlapping intersections 425), where feature values of some buckets were provided by the first malware family, while feature values of the rest of the buckets were acquired from the second malware family. The techniques herein may then use the refiner (FIG. 4C) and project large set of unlabeled (background) traffic 430 onto the feature space defined by the buckets. Unlabeled samples located in the areas defined by the hybrid family are considered as malicious, and used as synthetic malicious data 440 (FIG. 4D). (Notably, these samples 440 may, in fact, correspond to a new malware family, or a malware family that was already known, but not used yet as a labelled malicious flow).

With regard to the buckets, as mentioned above, each bucket contains features computed from traffic records, such as proxy log records. (Notably, when computing the length function of non-categorical features, such as file name length, the resulting feature values may be adjusted to make the output more categorical and thus comparable (e.g., using a binning technique with formula "floor($x^{0.68}$)", as will be appreciated by those skilled in the art). Examples of buckets may comprise any of the following feature sets, though many more may be conceived, and the list below is not meant to be exhaustive:

Volume:
    Number of bytes from client to server;
    Number of bytes from server to client.
Time:
    Duration.
Autonomous system:
    Code of autonomous system of server IP address.
URL:
    Length;
    Count of lower case characters;
    Count of upper case characters;
    Count of characters (#,&,@ . . . ).
Protocol:
    Is HTTPS;
    Is SSL.
Port:
    Has explicit port;
    Is known port (80, 8080, 443).
Host name:
    Is IP;
    Number of second level domains;
    Length;
    Count of lower case characters;
    Count of upper case characters;
    Count of special characters (#,&,@ . . . ).
Path:
    Length;
    Count of lower case characters;
    Count of upper case characters;
    Number of subdirectories.
File name:
    Length;
    Count of lower case characters;
    Count of upper case characters;
    Count of special characters (#,&,@ . . . );

Extension group ([gif,png,jpg,bmp], [php,htm,html], [xml,json]).
Query:
  Number of parameters;
  Length;
  Count of lower case characters;
  Count of upper case characters;
  Count of characters (#,&,@ ... ).
For the first 5 query parameters:
  Length of parameter name;
  Count of lower case characters in parameter name;
  Count of upper case characters in parameter name;
  Count of characters (#,&, @ ... ) in parameter name;
  Length of parameter value;
  Count of lower case characters in parameter value;
  Count of upper case characters in parameter value;
  Count of characters (#,&, @ ... ) in parameter value.
TLS:
  TLS chain length;
  TLS chain validation code;
  TLS host matches certificate;
  TLS issuer domain name (DN) popularity;
  TLS not before;
  TLS not after.
Global "Tor" relays (These anonymity-based features, as will be understood by those skilled in the art, are calculated globally and includes lists of known server IP addresses and ports that are typically connected to Tor traffic):
  Tor relays directory server;
  Tor relays directory port;
  Tor relays exit server;
  Tor relays guard server;
  Tor relays or port.
Global popularity of hostname:
  In max percentage of users—describes max percentage of users within the same network that are connected to the hostname (maximum is calculated across all networks);
  In number of networks—describes how many networks from our set of networks are connected to the corresponding hostname (globally);
  In number of users—describes how many users are connected to the corresponding hostname (globally).
Global popularity of autonomous systems:
  In number of domains—describes how many domains are connected to the corresponding autonomous system (globally);
  In number of users—describes how many users are connected to the corresponding autonomous system (globally).
And so on.

Figure 5:
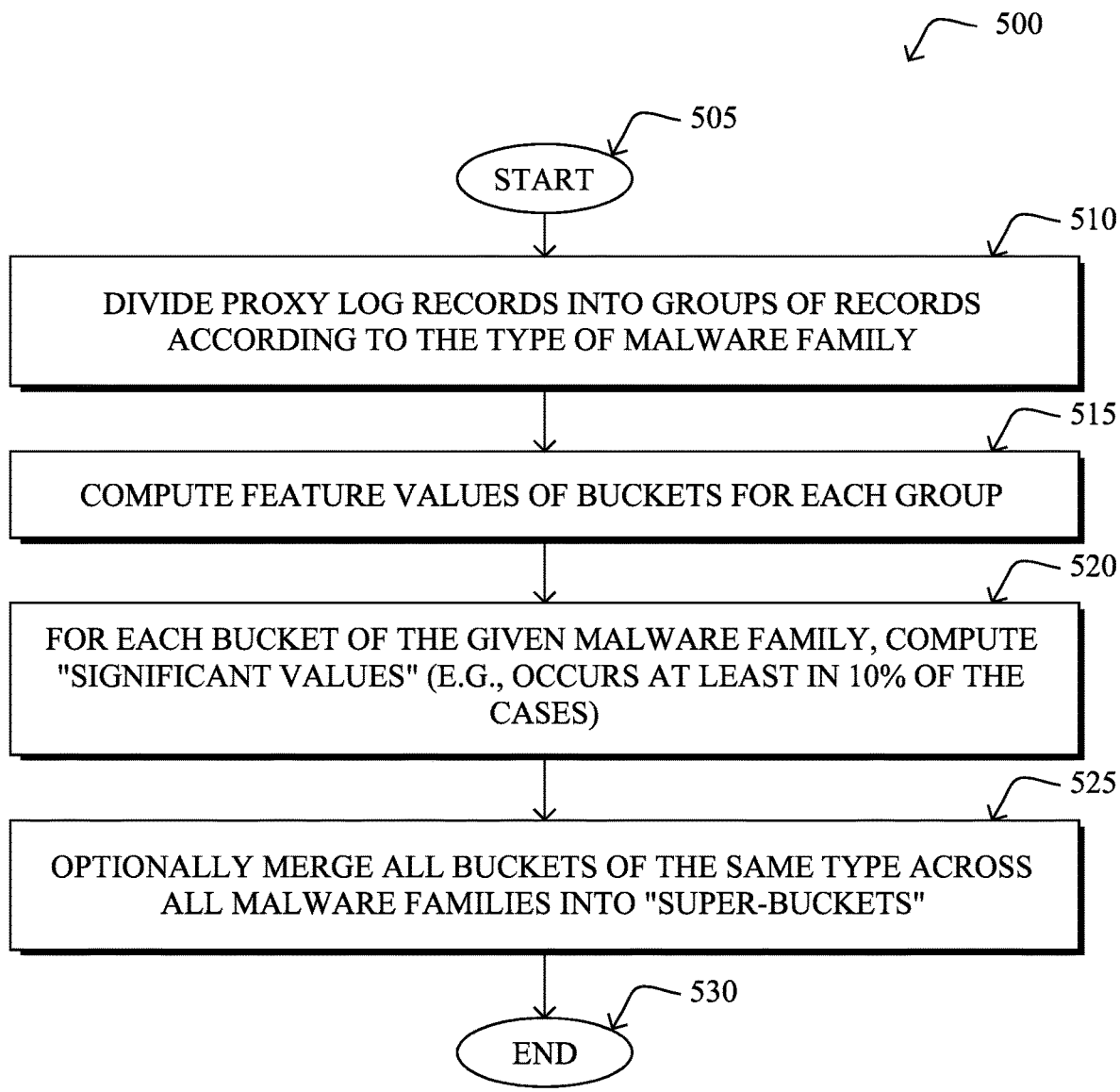
FIG. 5 illustrates an example simplified procedure for creating parameters of a synthetic malicious flow generator.

As mentioned above, the techniques herein has two illustrative phases: 1) creating parameters of the generator, and 2) finding new samples in the refinement phase. FIG. 5 illustrates an example simplified procedure 500 for creating parameters of a synthetic malicious flow generator. The procedure starts in step 505, and continues to step 510 where proxy log records of known high risk malware families to are divided into groups of records according to the type of malware family. In step 515, feature values of buckets (e.g., those listed above) are computed for each group, such that in step 520, for each bucket of the given malware family, the system herein computes "significant values", which are feature values that are typical for the corresponding bucket and malware family. A value is considered as significant if it occurs at least in some "significance threshold" of the cases (e.g., at least 5%, or in one particular embodiment, 10%). By this computation, every malware family is defined through significant feature values in the buckets. Optionally, to reduce the computational cost, in step 525 all buckets of the same type across all malware families may be merged into a "super-bucket", where each super-bucket contains all significant values of buckets of the same type across malware families. The generator phase illustratively ends in step 530.

Figure 6:
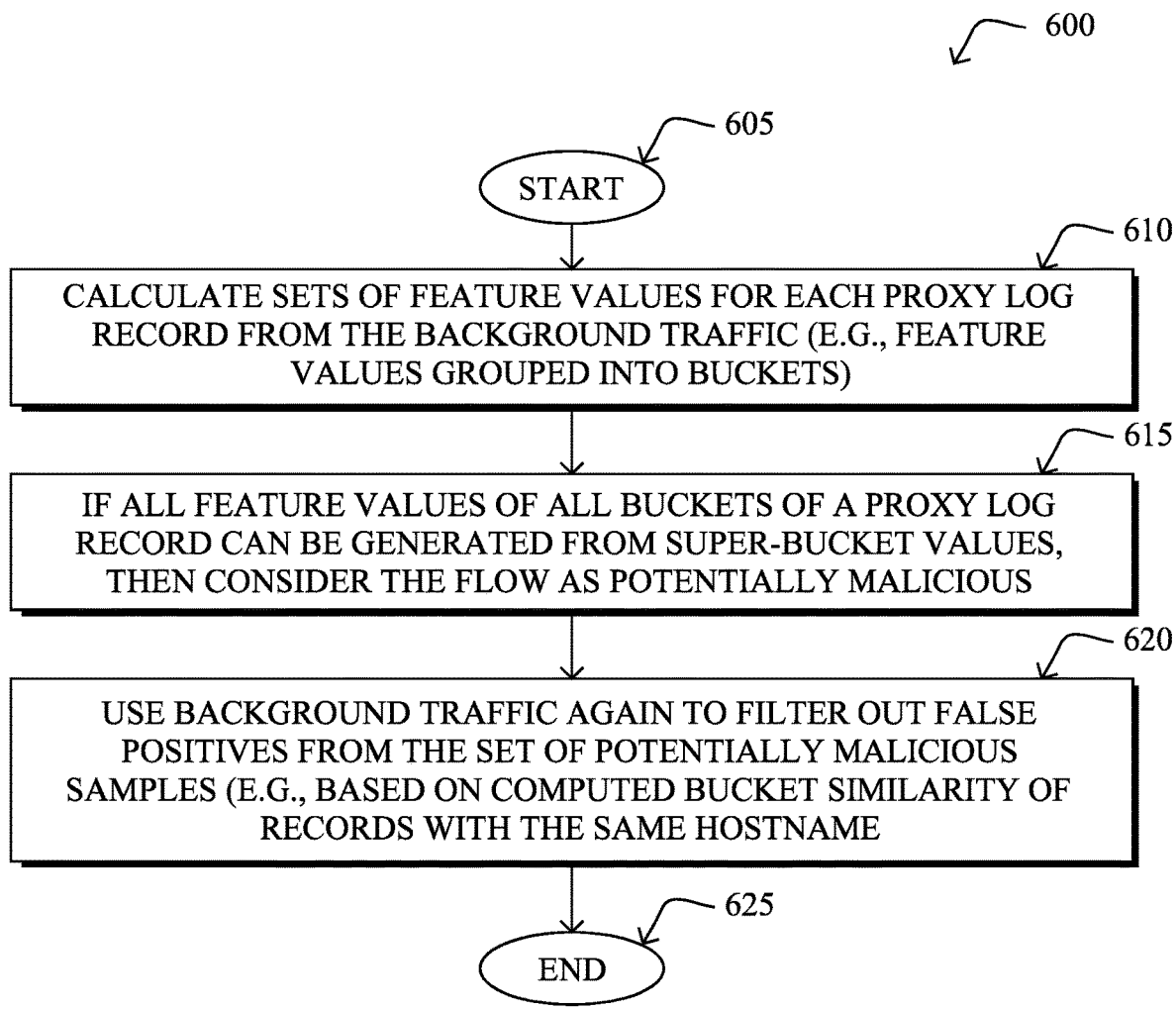
FIG. 6 illustrates an example simplified procedure for finding new synthetic malicious samples during a refinement phase.

For the refinement phase, FIG. 6 illustrates an example simplified procedure 600 for finding new synthetic malicious samples from large and unlabeled sets of background traffic. The procedure 600 begins in step 605, and continues to step 610 where a set of feature values is calculated for each proxy log record from the background traffic (real traffic). The feature values are grouped into buckets as described above. In step 615, the refinement considers a flow as "potentially malicious" if all feature values of all buckets of a proxy log record can be generated from super-bucket values. With this new set of potentially malicious samples from step 615, the procedure moves to step 620 where background traffic is used again to filter out false positives from the set of potentially malicious samples. That is, for each sample, the algorithm computes bucket similarity of all records from the background having the same hostname as the sample, and if the records are similar then the sample is considered as malicious (since malware and command and control (C&C) channels typically have a uniform behavior). The procedure 600 ends in step 625 with the refined synthetic malware samples, accordingly.

FIG. 7 illustrates an example of pseudocode 700 for finding new malicious records according to the techniques herein, demonstrating an example code-based programming for performing the illustrative procedures 500 and 600 described in greater detail above, collectively. Essentially, the code mirrors the description of procedures 500 and 600 above, where an illustrative "findNewMaliciousRecords( )" function first collects all malware families ("allMwFamilies") and super-buckets ("superBuckets"), such that for each malware family ("mwFamily"), significant values ("sigValues") are computed for the buckets ("computeBucketSigValues") based on the proxy log records for the malware family ("mwFamily.proxyLogRecords"). The significant values are then added to the super-buckets. For the refinement stage, the code gets the background records (real unlabeled traffic), and then defines potentially malicious samples as those matching the super-buckets' significant values (adding the record to the list of potentially malicious samples). Each sample from the list of potentially malicious samples may then be subjected to the false positive filtering from step 620 above, where hostnames are compared between the samples, and if all records of the same hostname have similar feature values, then the sample is added as a malicious sample, accordingly.

In closing, the techniques herein allow for finding new and previously unseen malware. In particular, in one example experiment, input data corresponding to a set of proxy log records from 116 known malware families was used, where records of one family were removed such that the generator created a model (i.e., super-buckets) from the remaining 115 families. Next, the experiment measured whether it is possible to generate buckets of the malware family that was taken out from the generator super-buckets. The experiment iterated this process for each malware family. The results were that the techniques herein were able to generate 58 of the malware families (50%), which supports the assumption about malware modularity and shared buckets. Additionally, in a second experiment, all 116 malware families were used to create super-buckets, and a large set of background traffic was used to create instances of new and potentially malicious samples. After filtering out false positives according to the techniques herein, 15 new and previously unseen malicious records were discovered that could be used to define new malware families.

Figure 8:
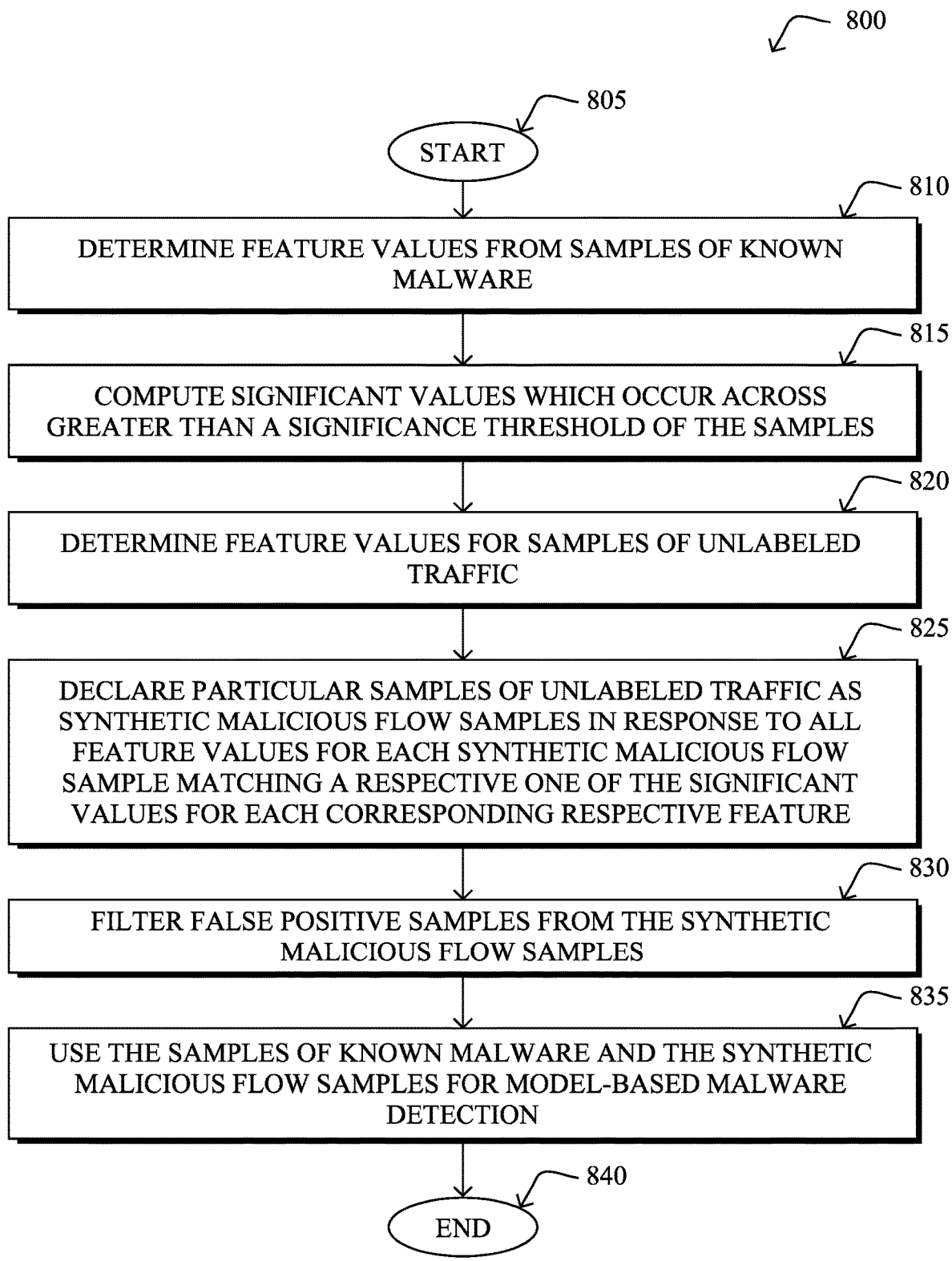
FIG. 8 illustrates an example simplified procedure for refining synthetic malicious samples with unlabeled data.

FIG. 8 illustrates an additional example simplified procedure for refining synthetic malicious samples with unlabeled data in accordance with one or more embodiments described herein. For example, a non-generic, specifically configured device (e.g., device 200, such as a "security device") may perform procedure 800 by executing stored instructions (e.g., process 248). The procedure 800 may start at step 805, and continues to step 810, where, as described in greater detail above, a plurality of values for a plurality of features are determined from samples of known malware. As mentioned above, the features can be any suitable feature/bucket, such as, e.g., volume features, time features, autonomous system features, URL features, protocol features, port features, host name features, path features, file name features, query features, TLS features, global anonymous relay features, global popularity of hostname features, global popularity of autonomous systems features, and so on.

In step 815, the security device may compute one or more significant values out of the plurality of values, where each of the one or more significant values occurs across greater than a significance threshold of the samples (e.g., greater than 5%, or in one particular embodiment, 10%). Note that as described above, when one or more correlated features are grouped into buckets, then the significant values correspond to groups of values that occur together across greater than the significance threshold of the samples.

In step 820, the security device determines feature values for samples of unlabeled traffic (real traffic, e.g., network flows, proxy logs, ETA data, etc.). As such in step 825, the security device may declare one or more particular samples of unlabeled traffic as synthetic malicious flow samples in response to all feature values for each synthetic malicious flow sample matching a respective one of the significant values for each corresponding respective feature, as described above. Note that where significant values are merged across families of known malware, then in step 825 one or more particular samples of unlabeled traffic may be declared as synthetic malicious flow samples in response to all feature values for each synthetic malicious flow sample matching at least one of the merged significant values.

False positive samples may be filtered from the synthetic malicious flow samples in step 830, such as by computing similarity of feature values between a given sample having a given hostname and all other samples from the synthetic malicious flow samples having the same hostname, and then declaring the given sample as a synthetic malicious flow only if the similarity surpasses a "filtering threshold" (i.e., sufficiently similar according to some threshold).

In step 835, the security device may then "use" the samples of known malware and the synthetic malicious flow samples for model-based malware detection. For instance, the security device may share the models for detection, or may perform detection itself.

The illustrative procedure 800 may then end in step 840, notably with the ability to continue adjusting the synthetic malicious flow samples over time, accordingly.

It should be noted that while certain steps within procedures 500-600 and 800 may be optional as described above, the steps shown in FIGS. 5-6 and 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 500-600 and 800 are described separately, certain steps from each procedure may be incorporated into each other procedure, and the procedures are not meant to be mutually exclusive.

The techniques described herein, therefore, provide for refining synthetic malicious samples with unlabeled data. In particular, the techniques herein automatically adapt the system to new and previously unseen variations of threats, and also create new labeled data that are critical for training more sophisticated detectors and classifiers. In addition, the techniques herein can be used with various types of input data, such as NetFlow, ProxyLogs, ETA, etc., and can be easily integrated into most security products already on the market.

Said differently, the techniques herein fill a gap in solutions available in the market by introducing the capability of detecting malware threats from the network traffic by generating realistic new variants of existing malware (generating synthetic security event samples without very specific rules). The techniques herein directly increase the number of incidents that can be detected (particularly increasing the variability of detected threats), thus increasing the efficacy of the overall system.

While there have been shown and described illustrative embodiments that provide for refining synthetic malicious samples with unlabeled data, it is to be understood that various other adaptations and modifications may be made within the spirit and scope of the embodiments herein. For example, while certain embodiments are described herein with respect to using certain models, features, labels, data, etc., for purposes of malware detection, the techniques herein are not limited as such and may be used with other particulars, in other embodiments. In addition, while certain protocols are shown, such as IP, HTTP, TLS, etc., other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   determining, by a security device in a computer network, a plurality of values for a plurality of features from samples of known malware;
   computing, by the security device, one or more significant values out of the plurality of values, where each of the one or more significant values occurs across greater than a significance threshold of the samples;
   determining, by the security device, feature values for samples of unlabeled traffic;

merging, by the security device, significant values across families of known malware by grouping one or more correlated features into buckets, wherein the significant values correspond to groups of values that occur together across greater than the significance threshold of the samples across the families;

declaring, by the security device, one or more particular samples of unlabeled traffic as synthetic malicious flow samples in response to all feature values for each synthetic malicious flow sample matching at least one of the merged significant values;

in response to merging and declaring, filtering, by the security device, false positive samples from the synthetic malicious flow samples based on computing a similarity of feature values among samples from the synthetic malicious flow samples that share the same hostname; and using, by the security device, the samples of known malware and the synthetic malicious flow samples for model-based malware detection.

2. The method as in claim 1, wherein filtering comprises: declaring the given sample as a synthetic malicious flow only if the similarity surpasses a filtering threshold.

3. The method as in claim 1, wherein the unlabeled traffic is selected from a group consisting of: network flows; proxy logs; and encrypted traffic analysis (ETA) data.

4. The method as in claim 1, wherein features are selected from a group consisting of: volume features; time features; autonomous system features; uniform resource locator (URL) features; protocol features; port features; host name features; path features; file name features; query features; transport layer security (TLS) features; global anonymous relay features; global popularity of hostname features; and global popularity of autonomous systems features.

5. The method as in claim 1, wherein the significance threshold is greater than 5%.

6. A tangible, non-transitory, computer-readable medium storing program instructions that cause a computer to execute a process comprising:
    determining a plurality of values for a plurality of features from samples of known malware;
    computing one or more significant values out of the plurality of values, where each of the one or more significant values occurs across greater than a significance threshold of the samples;
    determining feature values for samples of unlabeled traffic;
    merging significant values across families of known malware by grouping one or more correlated features into buckets, wherein the significant values correspond to groups of values that occur together across greater than the significance threshold of the samples across the families;
    declaring one or more particular samples of unlabeled traffic as synthetic malicious flow samples in response to all feature values for each synthetic malicious flow sample matching at least one of the merged significant values;
    in response to merging and declaring, filtering false positive samples from the synthetic malicious flow sample based on computing a similarity of feature values among samples from the synthetic malicious flow samples that share the same hostname; and
    using the samples of known malware and the synthetic malicious flow samples for model-based malware detection.

7. The computer-readable medium as in claim 6, wherein filtering comprises:
    declaring the given sample as a synthetic malicious flow only if the similarity surpasses a filtering threshold.

8. The computer-readable medium as in claim 6, wherein the unlabeled traffic is selected from a group consisting of: network flows; proxy logs; and encrypted traffic analysis (ETA) data.

9. The computer-readable medium as in claim 6, wherein features are selected from a group consisting of: volume features; time features; autonomous system features; uniform resource locator (URL) features; protocol features; port features; host name features; path features; file name features; query features; transport layer security (TLS) features; global anonymous relay features; global popularity of hostname features; and global popularity of autonomous systems features.

10. The computer-readable medium as in claim 6, wherein the significance threshold is greater than 5%.

11. An apparatus, comprising:
    one or more network interfaces to communicate with a computer network;
    a processor coupled to the network interfaces and configured to execute one or more process; and
    a memory configured to store a process executable by the processor, the process when executed configured to:
        determine a plurality of values for a plurality of features from samples of known malware;
        compute one or more significant values out of the plurality of values, where each of the one or more significant values occurs across greater than a significance threshold of the samples;
        determine feature values for samples of unlabeled traffic;
        merge significant values across families of known malware by grouping one or more correlated features into buckets, wherein the significant values correspond to groups of values that occur together across greater than the significance threshold of the samples across the families;
        declare one or more particular samples of unlabeled traffic as synthetic malicious flow samples in response to all feature values for each synthetic malicious flow sample matching at least one of the merged significant values;
        in response to merging and declaring, filter false positive samples from the synthetic malicious flow samples based on computing a similarity of feature values among samples from the synthetic malicious flow samples that share the same hostname; and
        use the samples of known malware and the synthetic malicious flow samples for model-based malware detection.

12. The apparatus as in claim 11, wherein the process, when executed, is further configured to filter by:
    declaring the given sample as a synthetic malicious flow only if the similarity surpasses a filtering threshold.

13. The apparatus as in claim 11, wherein the unlabeled traffic is selected from a group consisting of: network flows; proxy logs; and encrypted traffic analysis (ETA) data.

14. The apparatus as in claim 11, wherein features are selected from a group consisting of: volume features; time features; autonomous system features; uniform resource locator (URL) features; protocol features; port features; host name features; path features; file name features; query features; transport layer security (TLS) features; global anonymous relay features; global popularity of hostname features; and global popularity of autonomous systems features.

15. The apparatus as in claim 11, wherein the significance threshold is greater than 5%.

* * * * *

UNITED STATES PATENT AND TRADEMARK OFFICE
CERTIFICATE OF CORRECTION

PATENT NO. : 10,917,421 B2
APPLICATION NO. : 15/898789
DATED : February 9, 2021
INVENTOR(S) : Karel Bartos et al.

Page 1 of 1

It is certified that error appears in the above-identified patent and that said Letters Patent is hereby corrected as shown below:

In the Specification

Column 4, Line 58, should read:
such as SLN is expected to learn the new behavior and Signed and Sealed this
Twentieth Day of April, 2021

Drew Hirshfeld
*Performing the Functions and Duties of the
Under Secretary of Commerce for Intellectual Property and
Director of the United States Patent and Trademark Office*